United States Patent [19]

Schmidt et al.

[11] Patent Number: 4,467,335
[45] Date of Patent: Aug. 21, 1984

[54] SYSTEM FOR FORMING AN IMAGE ON THE SURFACE OF A PLASTIC CARD

[75] Inventors: Robert H. Schmidt, Minnetonka; Leroy E. Gerlach, Bloomington; Craig A. Fordahl, Minneapolis, all of Minn.

[73] Assignee: Data Card Corporation, Minnetonka, Minn.

[21] Appl. No.: 376,031

[22] Filed: May 7, 1982

[51] Int. Cl.³ .............................................. G01D 15/14
[52] U.S. Cl. ..................................... 346/160; 346/108; 355/3 TR
[58] Field of Search ............ 101/DIG. 13; 346/76 L, 346/108–109, 134–135, 153.1, 160; 354/5; 358/301; 355/3 TR

[56] References Cited

U.S. PATENT DOCUMENTS

| | | | |
|---|---|---|---|
| 3,343,142 | 9/1967 | Clark | 346/160 X |
| 3,389,403 | 6/1968 | Cottingham | 346/108 |
| 3,497,411 | 2/1970 | Chebiniak | 156/234 |
| 3,582,439 | 6/1971 | Thomas | 346/134 X |
| 3,597,071 | 7/1971 | Jones | 346/160 X |
| 3,685,896 | 8/1972 | Kaupp | 355/3 TR |
| 3,800,303 | 3/1974 | Picquendar | 95/4.5 |
| 3,841,750 | 10/1974 | Isonaka | 355/3 |
| 3,909,254 | 9/1975 | Tamai | 96/1 |
| 3,974,506 | 8/1976 | Starkweather | 346/45 |
| 4,002,829 | 1/1977 | Hutchison | 358/286 |
| 4,006,050 | 2/1977 | Hurst | 156/234 |
| 4,006,986 | 2/1977 | Kuehnle | 355/14 |
| 4,026,642 | 5/1977 | Tanaka | 355/1 |
| 4,052,715 | 10/1977 | Streifer | 346/160 |
| 4,052,739 | 10/1977 | Wada | 258/299 |
| 4,060,441 | 11/1977 | Ohta | 156/234 |
| 4,130,834 | 12/1978 | Mender | 358/127 |
| 4,169,275 | 9/1979 | Gunning | 358/300 |
| 4,175,851 | 11/1979 | Kitamura et al. | 346/160 |
| 4,217,819 | 8/1980 | von Tluck et al. | 101/DIG. 13 |
| 4,233,612 | 11/1980 | Hirayama et al. | 346/160 |

Primary Examiner—Thomas H. Tarcza
Attorney, Agent, or Firm—Kinney & Lange

[57] ABSTRACT

A system for forming an image on the outer surface of a plastic card and for correlating image data with corresponding alphanumeric data, comprises a data acquisition subsystem, an embosser/encoder, an exposure station for scanning an electrophotographic medium in accordance with digital image data generated by the data acquisition system, and a toning station for toning the electrophotographic medium to produce a toner image. The embosser/encoder forms identifying information corresponding to the alphanumeric data on the card and provides the embossed/encoded card to an image transfer station. At the image transfer station, the toner image on the electrophotographic medium is transferred to a portion of the card through heat and pressure. A protective layer is placed over the fused toner image.

11 Claims, 12 Drawing Figures

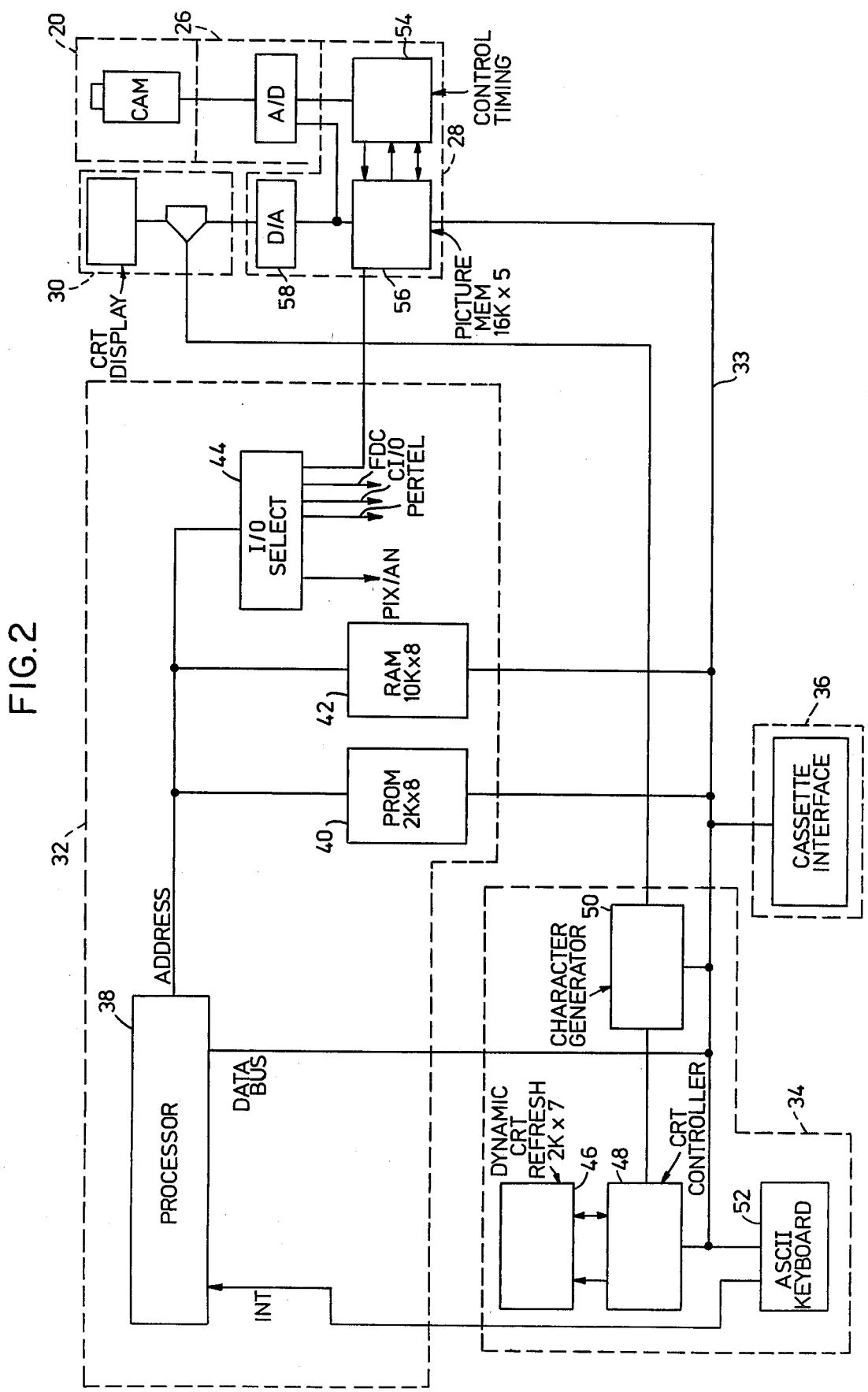

SYSTEM FOR FORMING AN IMAGE ON THE SURFACE OF A PLASTIC CARD

BACKGROUND OF THE INVENTION

1. Field of the Invention

This invention relates to a system for forming an image on the outer surface of a plastic card and especially to a system which correlates image data with corresponding alphanumeric data employed, for example, in embossing or encoding the plastic card.

2. Description of the Prior Art

There exist, in the prior art, systems for laminating over photographs placed in a cut-out in the inner core stock of a plastic card, and systems for laminating over an electrophotographic or printed image on the inner core stock of a card. Such prior art lamination systems do not have the capability of correlating alphanumeric data with image data but instead require a separate image forming procedure in which a photograph is physically placed in the card (or an image is printed on the inner core of the card) and laminated, followed by an embossing procedure. In addition, such systems do not make use of conventional plastic cards since they require that the core stock be exposed to receive an image, and subsequently laminated, resulting in the requirement of expensive cards. Such prior art lamination systems slow down the through-put of the plastic cards when carried out in conjunction with embossing and/or encoding of the plastic cards. Finally, since the cost of each individual photograph is relatively high, these lamination systems are not particularly suitable for high volume applications.

One other prior art system for forming images on plastic cards is a system in which a silk screened ink patch is placed on the surface of a plastic card and an image is etched on the silk screened ink patch using an electronically actuated mechanical scribe. As in the case of the prior art lamination systems, such scribing systems do not have the capability of correlating image data and alphanumeric data for placement of corresponding indicia on a single plastic card. In addition, the scribing system is relatively slow, making it unacceptable in an overall system in which embossing and encoding is also to be performed. Further, since it is necessary to provide a silk screened ink patch on each card, it is not possible to use conventional plastic cards, thereby resulting in an increased cost per card. Finally, the grooves which are present in scribed images are susceptible to the collection of dirt in a wallet environment, thereby resulting in a relatively nondurable card.

There is therefore a need in the industry for a system which is capable of correlating image data and corresponding alphanumeric data, forming an image on a card in accordance with the image data, and embossing and/or encoding the card in accordance with the alphanumeric data. Furthermore, there is a need for such a system in which the image is formed on the outer surface of a conventional plastic credit card in sequence with the embossing and/or encoding of the card. There is a further need for such a system which forms a card having an image which is durable in that it is resistant to wear, abrasion, and the chemicals present in a wallet environment. In addition, there is a need for such a card forming system in which the time for forming the image on the plastic card is approximately the same as or less than the times required for embossing and/or encoding a magnetic stripe. Finally, there is a need for a system for forming an image on a card wherein the cost per image is sufficiently low, and wherein a high resolution image is obtained.

SUMMARY OF THE INVENTION

An object of the present invention is to provide a system for forming an image on a plastic card which overcomes the deficiencies of prior art systems.

In particular, it is an object of the present invention to provide a system for forming an image on the outside surface of a conventional plastic card in sequence with the embossing and/or encoding of the card.

A further object of this invention is to provide a system in which image data representing an image is correlated with corresponding alphanumeric data representing indicia which is to be embossed and/or encoded on the card.

A further object of this invention is to provide a system which produces a card having a durable image.

A further object of this invention is to provide a system in which the time required for forming the image is substantially the same as or less than the time required for embossing and/or encoding the card.

A still further object of this invention is to provide a system for producing a high resolution image on the card.

The system of the present invention has a number of novel features, as set forth below. An image is digitized and stored in semi-permanent storage together with corresponding alphanumeric data representing, for example, indicia to be embossed and/or encoded on a card. When the image is to be formed on a conventional plastic card, the digital image data is read from the semi-permanent storage and is input to an acousto-optic modulator. The acousto-optic modulator modulates a coherent light beam in accordance with the digital image data and the modulated coherent light beam is scanned across a charged electrophotographic medium, thereby producing a latent electrostatic image (corresponding to the image to be formed on the card) on the electrophotographic medium. The electrophotographic medium is transported past a toning station and a toner image (corresponding to the latent electrostatic image) is formed on the electrophotographic medium. The toner image is positioned adjacent a card to which the image is to be transferred and the electrophotographic medium is then pressed against the card so as to transfer the toner image to the card through heat and pressure. The electrophotographic medium is peeled away from the card so that the fused toner image remains on the card. A plastic overlay which is substantially the same size as the image on the card, may be overlayed to provide additional protection for the image.

The system of the present invention has significant advantages over the prior art in that conventional plastic cards may be used, so that cheaper and more readily available unprocessed plastic cards may be employed. In addition, the system of the present invention does not slow down the throughput of the plastic card manufacturing process since the time for forming the image on the card is comparable to the time required for embossing and encoding operations. Further, in the system of the present invention, the storage of digital data comprising image data and corresponding alphanumeric data, allows for simple and accurate processing of all of the information which must be provided for each cardholder.

These together with other objects and advantages, which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a block diagram illustrating the details of the data acquisition subsystem of FIG. 1;

DESCRIPTION OF THE PREFERRED EMBODIMENT

Figure 1:
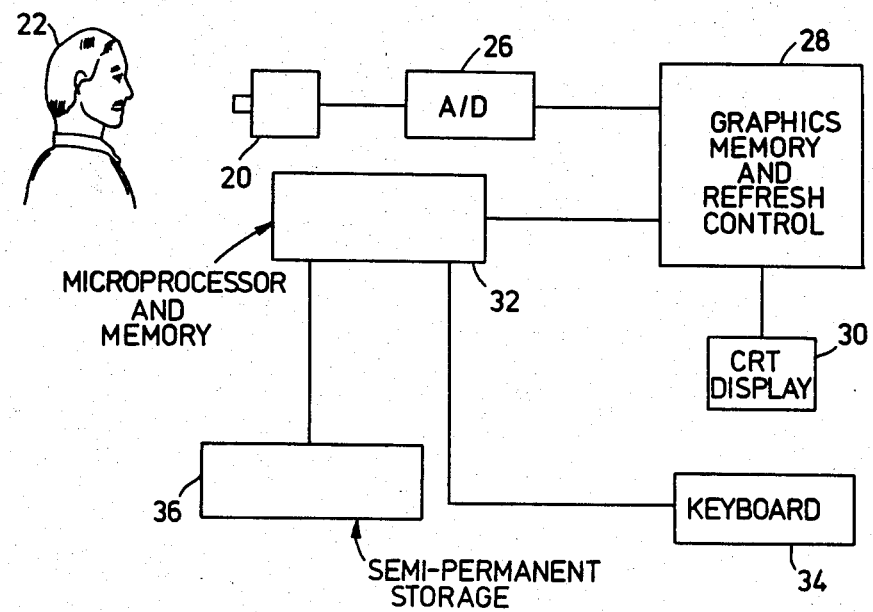
FIG. 1 is a block diagram of a data acquisition subsystem, including a circuit for acquiring and storing image data and alphanumeric identification data, in accordance with the present invention.

FIG. 1 illustrates the data acquisition subsystem of the present invention. A video camera 20 is employed to take a picture of a subject or cardholder 22 for whom a card 24 (FIG. 3) is to be formed. In the preferred embodiment, the video camera is the RCA Model No. 2055 Vidicon camera which is a source of a live video picture. The card 24 which is to be generated for each cardholder 22 may be, for example, a plastic credit card, a driver's license, or any other type of identification card which is suitable for manufacture in the system of the present invention. For convenience, reference is made hereinafter to a "card" 24.

A video digitizer 26 receives an analog image signal from the camera 20 and generates a digital image signal, wherein each digital word represents a gray level of a small portion of the image. A graphics memory and refresh control circuit 28 receives the digital image signal from the video digitizer 26 and generates an analog video signal for a CRT display 30 which displays an image of the subject 22. The graphics memory and refresh control circuit 28 is also connected to a microprocessor and memory circuit 32 for transmitting and receiving the digital data signal along a bi-directional data bus 33 and for receiving an address signal as well as input/output read and write signals. The microprocessor and memory 32 may be connected to a remote computer or microprocessor via a standard RS-232C link. A keyboard 34 is also connected to the microprocessor and memory 32 so that alphanumeric data (e.g., embossing data, name and address information, account information, encoding information, and other identifying information) can be input to the microprocessor and memory 32. This alphanumeric data is correlated with the corresponding ditigal image data and temporarily stored in the graphics memory and refresh control circuit 28 and displayed on CRT display 30. The microprocessor and memory 32 is also connected to semi-permanent storage 36 so that the alphanumeric and digital image data which is temporarily stored in the graphics memory and refresh control circuit 28 may be output to the semi-permanent storage 36 for later retrieval.

The data acquisition subsystem of FIG. 1 will be described in detail with reference to FIG. 2. The microprocessor and memory 32 controls the operation of the data acquisition subsystem and includes a processor 38, a PROM (programmable read only memory) 40, a RAM (random access memory) 42 and an input/output selection circuit 44. The PROM 40 stores the control program for the processor 38. The RAM 42 provides temporary storage for the digital picture data and alphanumeric data during transfer of data to the semi-permanent storage 36. The I/O selection circuit 44 controls the input and output of data to and from the microprocessor and memory 32. The keyboard 34 comprises an alphanumeric refresh memory 46, a CRT controller 48, a character (dot) generator 50 and keyboard switches 52. When one of the keyboard switches 52 is depressed, the central processor 38 is interrupted and the processor 38 reads the ASCII character from the keyboard 34 and stores it in the RAM 42. The character generator 50 decodes the keyboard character and sends a dot pattern, corresponding to the one of the keyboard switches 52 which has been depressed, to the CRT controller 48. This dot pattern is stored in the alphanumeric refresh memory 46 and the CRT display 30 continuously displays the dot pattern until the alphanumeric refresh memory 46 is altered or cleared.

The video camera 20 and video digitizer 26 capture a live field of video from the camera within at least 1/30th of a second. In the preferred embodiment, the video digitizer 26 is a fully parallel (flash) analog-to-digital (A/D) converter.

The graphics memory and refresh control circuit 28 includes a control timing circuit 54, a picture memory 56 and a digital-to-analog converter 58. The control timing circuit 54 samples the output of the video digitizer 26 at a rate which will yield a one-to-one aspect ratio. The sampled data is stored in the picture memory 56 and is used to refresh the CRT display 30 which displays the picture. The video camera 20 provides horizontal and vertical synchronization pulses for aligning the image displayed on the CRT display 30 with what the camera views. After the vertical retrace interval of the video camera 20, the control timing circuit 54 initializes the picture memory 56 to begin storing new camera data. After a picture has been completely stored in the picture memory 56, the last digitized field of camera video is "frozen" in the picture memory 56 and may then be accessed by the microprocessor and memory 32 which receives the stored picture. The microprocessor and memory 32 performs various processing routines to improve the quality of the image. In addition, the picture is compressed to reduce the amount of data necessary to represent the picture to be stored on the semi-permanent storage 36.

The alphanumeric data which is input via the keyboard 34, is correlated with the digital picture data received from the picture memory 56 in the RAM 42. The correlated alphanumeric data and digital image data are temporarily stored in the RAM 42 and the digital words representing the image data are placed in specific memory locations representing the location of the picture element (pixel) whose gray level is the content of that memory element. Thus, the image is digitized so that the gray level in each discrete picture element is stored in memory locations representing the actual location in the visual image. The corresponding alphanumeric data is stored in adjacent memory locations to identify the images corresponding to the data. By using the keyboard 34, it is also possible to superimpose alphanumeric data on the image on the CRT display 30. In this case, the image data which is stored will correspond to the combined image (picture plus alphanumeric data) which is generated on the CRT display 30. Thus, a convenient check on the correspondence between the alphanumeric data which is formed (e.g., embossed) on the card and the image which is formed on the card, may be made. Once the correlated alphanumeric and digital image data have been stored in the RAM 42, the central processor 38 outputs the stored data on the bi-directional data bus 33 to the semi-permanent storage 36. In the preferred embodiment, the semi-permanent storage 36 includes a cassette interface and a magnetic tape cassette on which digital data is stored during the data acquisition phase of the present system.

Figure 5:
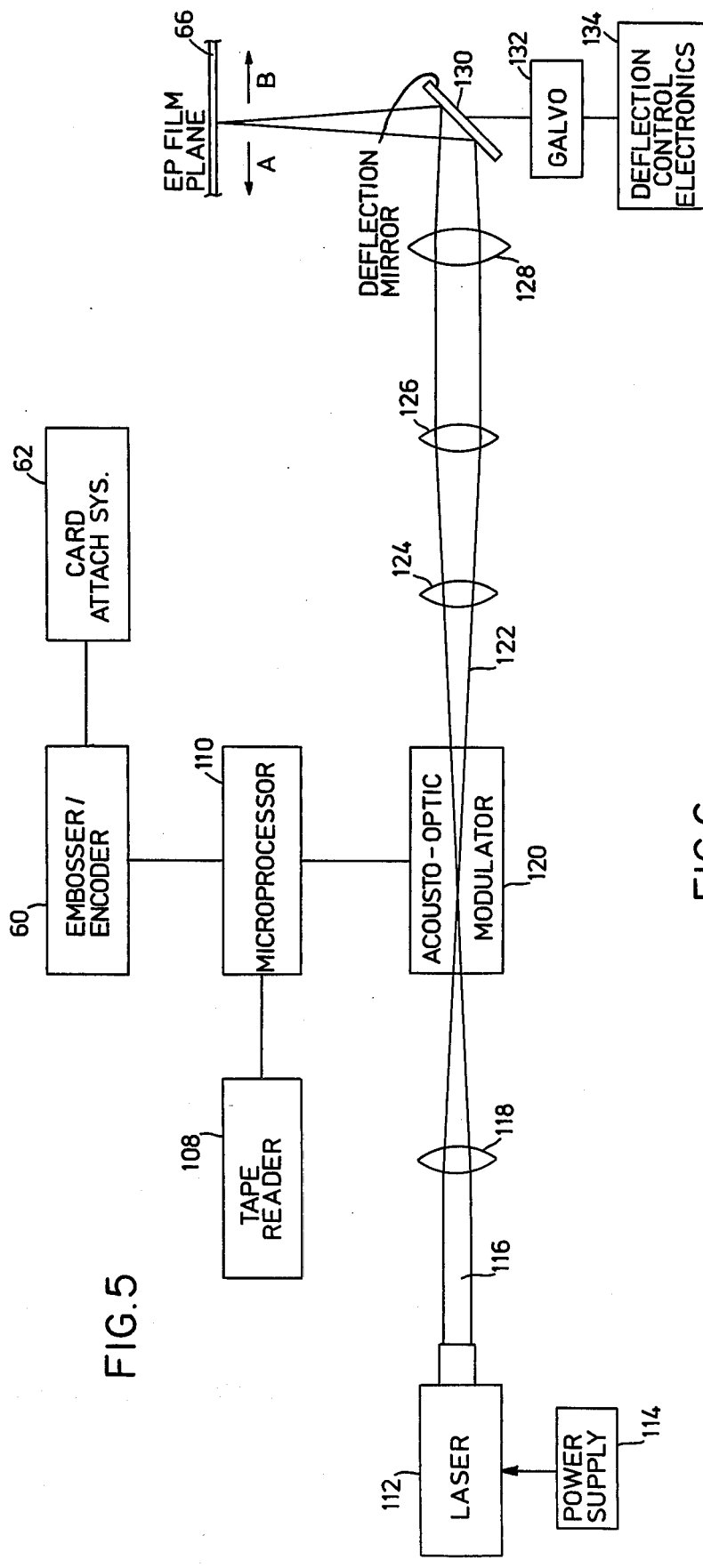
FIG. 5 is a right side elevational view depicting, partially in block format, the components of the exposure station of FIG. 3 and their connection to a microprocessor and an embosser/encoder.
Figure 6:
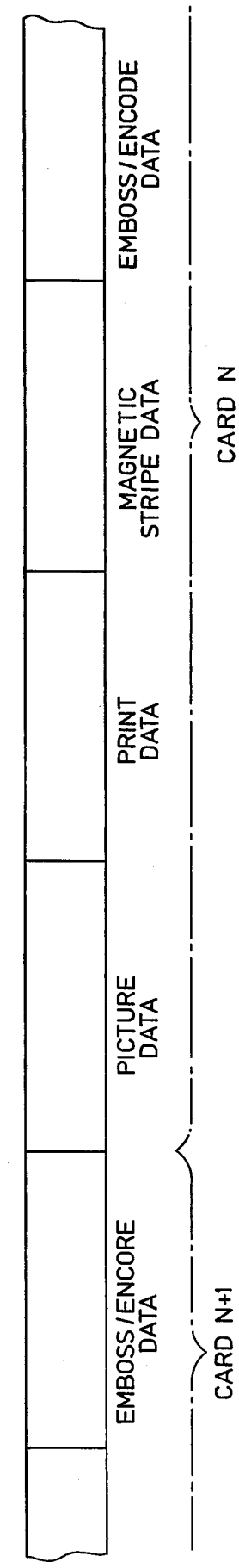
FIG. 6 is an illustration of the format of the data on the magnetic tape which may be employed as the semi-permanent storage 36 of FIG. 1.

Referring to FIG. 6, the data stored on the magnetic tape for each card to be manufactured includes digital image (i.e. picture) data, print data, magnetic stripe data and emboss/encode data. The print data, emboss/encode data and magnetic stripe data are transmitted to an embosser/encoder 60 (FIG. 5). Thus, the system of the present invention may be operated "in line" with any automatic embossing system, and preferably with an automatic embossing system manufactured by Data Card Corporation. For example, the system of the present invention may be operated "in line" with the Data Card Series 4000 embosser/encoder described in U.S. Pat. No. 4,088,216, assigned to the assignee of the present application, the disclosure of which is hereby incorporated by reference; or the Data Card Series 1500 embosser described in U.S. Pat. No. Re 27,809, assigned to the assignee of the present application, the disclosure of which is hereby incorporated by reference. Alternatively, the system of the present invention may be used as a stand-alone system to fully image a card with alphanumeric data, picture(s) signature(s) and the like.

Figure 3:
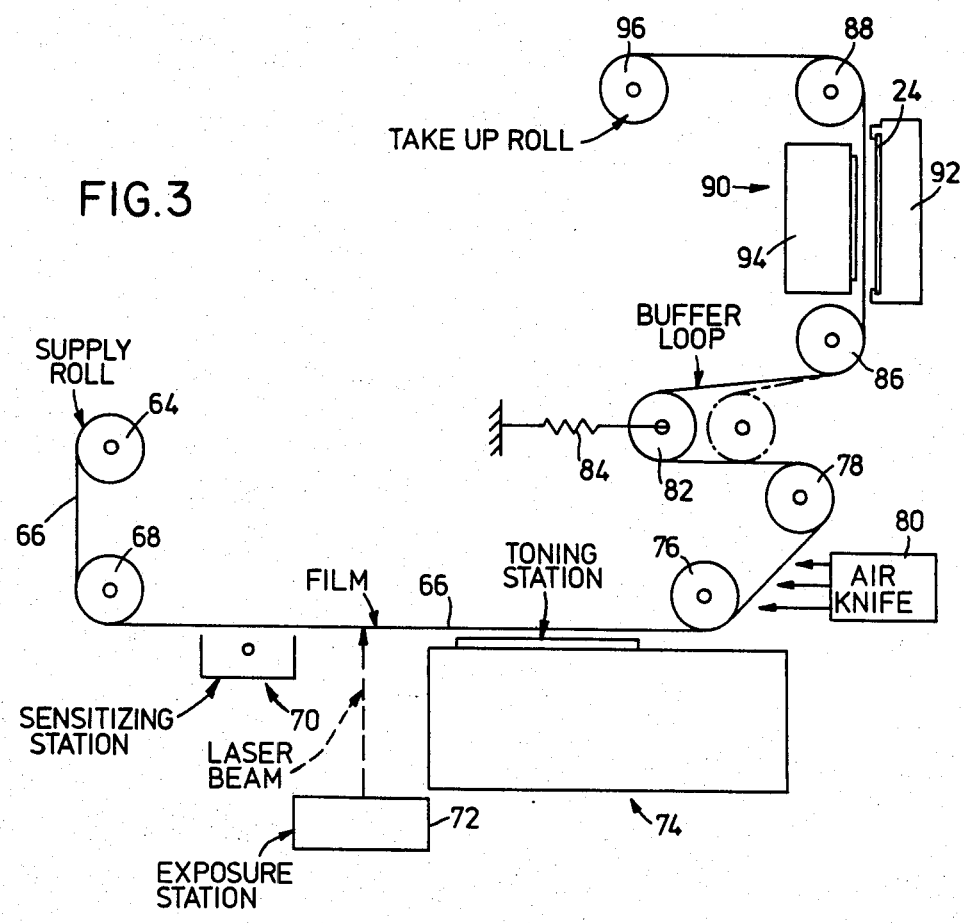
FIG. 3 is a right side elevational view depicting a sensitizing station, an exposure station, a toning station and a transfer station in accordance with the system of the present invention.

FIG. 3 is a right side elevational view of the overall image generating and transfer subsystem of the present invention. A supply roll 64 holds a roll supply of an electrophotographic medium 66 which in the preferred embodiment is electrophotographic film. In an alternate embodiment a selenium drum is employed as the electrophotographic medium 66. The electrophotographic film 66 is drawn around a roller 68 and past a sensitizing station comprising a corona generator 70 for placing a charge on the surface of the electrophotographic film 66. The sensitized film 66 is transported past an exposure station 72 and a toning station 74. The exposure station 72 generates a modulated laser beam which is scanned across the sensitized electrophotographic film 66 to produce a latent electrostatic image on the film 66. As the film 66 is transported past the toning station 74, charged toner is attracted to the scanned portions of the film 66, so that a toner image is formed on the film 66. The film 66, carrying the toner image, is transported around a pair of rollers 76 and 78 which orient the film 66 so that an air knife 80 can remove any loose toner particles and residual solvent which are carried by the film 66. The film 66 is transported around a roller 82 which is spring biased by a spring 84 to form a buffer loop, which provides a flexible film interface between the image development portion of the system, which operates at substantially constant film velocity, and the image transfer portion of the system which operates with incremental motion. A pair of rollers 86 and 88 are employed to position the toner image carrying film 66 in a transfer station 90. The transfer station 90 comprises a card back up block 92 and a heated platen 94. After the film is transported through the transfer station 90 and the toner image is transferred from the film 66 to the card 24, the film 66 is transported to a take up roll 96 where it is stored for disposal.

Figure 4:
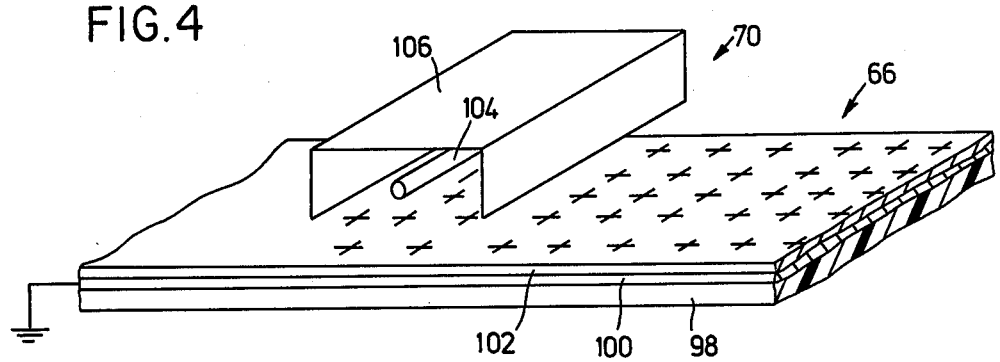
FIG. 4 is a perspective view of the sensitizing station of FIG. 3.

Referring to FIG. 4, the electrophotographic film 66 and the sensitizing station will be described. As noted above, in the preferred embodiment, the electrophotographic medium 66 comprises electrophotographic film 66. The electrophotographic film 66 comprises a support base 98, a thin conductive layer 100 which is grounded to the film spool (not shown) and a photoconductive layer 102 which has a high dark resistance. The corona generator 70 comprises a thin wire 104 and a conducting enclosure 106. The film 66 is sensitized (i.e., made light sensitive) by generating a voltage of 3,500 volts or more between the wire 104 and the enclosure 106. This high voltage causes the surrounding air to ionize, thereby causing positive ions to be attracted to the photoconductive layer 102 of the film 66. The corona generator 70 is employed to place a uniform electrostatic charge on the surface of the film 66.

Referring to FIG. 5, the exposure station 72 of FIG. 3 will be described. The exposure station 72 may be directly connected to the data acquisition subsystem illustrated in FIG. 1. Alternatively, digital image data and alphanumeric data can be stored on magnetic tape at a remote location (using the data acquisition subsystem of FIG. 1) and the magnetic tape can then be transported to a location for manufacturing a plurality of cards 24. In the preferred embodiment, the data acquisition subsystem of FIG. 1 is employed at remote locations to store digital image data and alphanumeric data for a plurality of subjects 22. The stored digital image data and alphanumeric data is then transported (e.g., either physically, as a magnetic tape or disk, or over phone lines) to a site having complete facilities for manufacturing cards (including, e.g., an embosser/encoder, a card attaching system, etc.) where the information stored on the magnetic tape is read by a tape reader 108. Thus, the tape reader 108 provides both alphanumeric data and digital image data to a microprocessor 110 which in turn provides the alphanumeric data to the embosser/encoder 60 and supplies the digital image data to the exposure station 72. In the embodiment of the present invention in which the data acquisition subsystem of FIG. 1 is used to read the magnetic tape during the card forming process, the microprocessor 110 and tape reader 108 are not required since the microprocessor and memory 32 and the semi-permanent storage 36 perform these functions.

The exposure station 72 comprises a laser 112, powered by its own power supply 114, for generating a coherent light beam 116, hereinafter referred to as laser beam 116. In the preferred embodiment the laser 112 is a Hughes model 3225 H-PC 5MW HeNe laser. A beam compressor lens 118 compresses the laser beam 116 and feeds the laser beam 116 to an acousto-optic modulator 120. The acousto-optic modulator 120 is connected to the microprocessor 110 to receive the digital image data. The acousto-optic modulator 120 digitally modulates the laser beam 116, in accordance with the digital image data, to generate a modulated laser beam 122 which is passed through a pair of beam expander lenses 124 and 126 and an objective lens 128. The beam expander lenses 124 and 126 expand the modulated laser beam 122 to achieve smaller spot sizes at the plane of the film 66. The modulated laser beam 122 passes from the objective lens 128 to a deflection mirror 130 which is oscillated by a galvanometer 132 under the control of deflection control electronics 134. Thus, the modulated laser beam 122 is scanned back and forth across the plane of the film 66 in the directions of the arrows A and B in FIG. 5.

In the preferred embodiment, the acousto-optic modulator 120 comprises an Isomet 1205C or 1206C acousto-optic modulator; the galvanometer 132 comprises a General Scanning S-230-08 galvanometer; and the deflection control electronics 134 comprises a General Scanning model AX-700 galvanometer controller.

By scanning the modulated laser beam 122 across the sensitized electrophotographic film 66, the impingement of the laser beam 122 upon the photoconductive layer 102 causes the positive ions which are attracted to the surface of the photoconductive layer 102 to be conducted to the thin conductive layer 100. Thus, a latent electrostatic image is formed on the surface of the photoconductive layer 102. This image has a resolution of 125 pixels per inch and requires an exposure time of 1/60th second. The image is broken down into 15,625 pixels per square inch, each pixel being 8 mils square with 64 possible dot positions. A varying gray scale is achieved by selectively exposing the dot positions within each pixel.

Figure 7:
FIG. 7 is a right side elevational view illustrating a toner image 136 on the electrophotographic film 66.

In the preferred embodiment, the electrophotographic film 66 is Kodak SO-102 electrophotographic film and the toner which is used to tone the film is Kodak MX-1112 or MX-1125 liquid toner. As the electrophotographic film 66 is transported past the toning station 74, the toner (which is positively charged in the preferred embodiment) is attracted to the areas of the photoconductive layer 102 which have been exposed by the modulated laser beam 122. Thus, a toner image 136 (FIG. 7) is formed on the surface of the electrophotographic film 66.

Figure 8A:
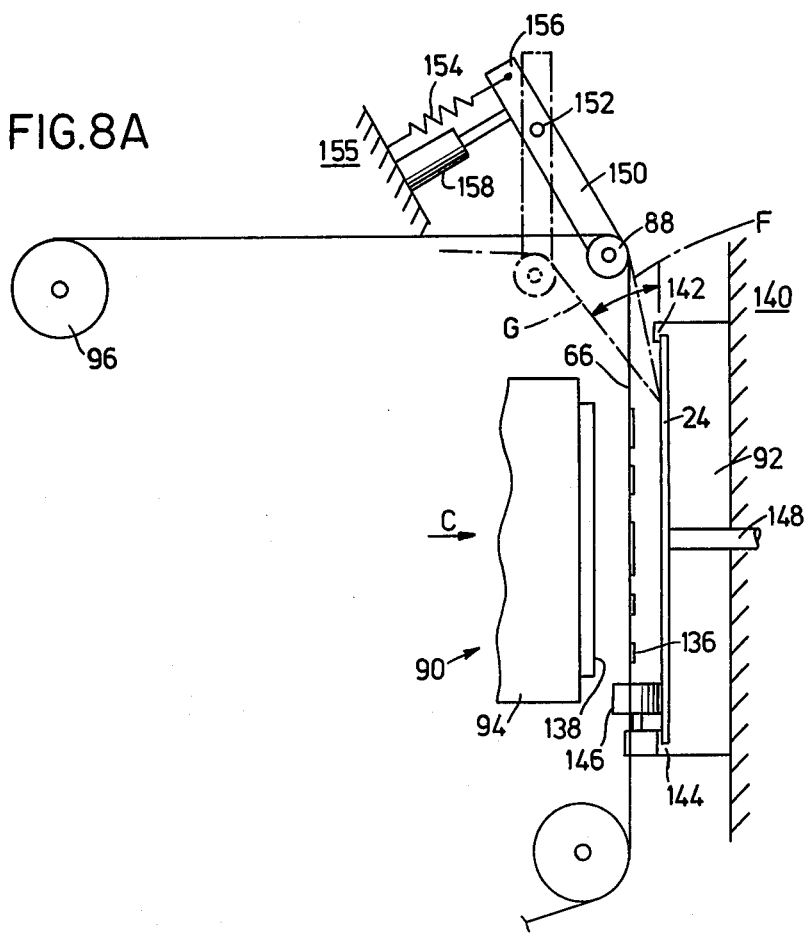
FIG. 8A illustrates the relative positioning of a card and the toner image just prior to transfer of the toner image to the card.
Figure 8B:
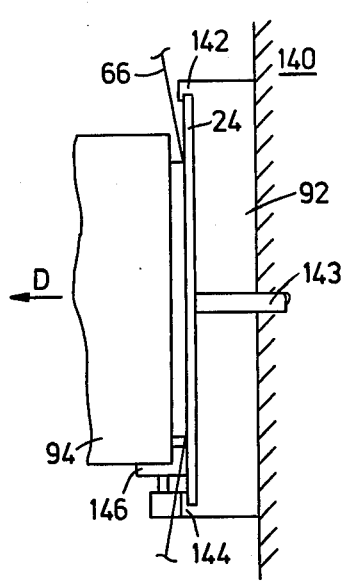
FIG. 8B is a right side elevational view illustrating the platen in the transfer position, applying heat and pressure to the electrophotographic film to transfer the toner image to the card.

Referring to FIGS. 8A-8C and 9, the transfer of the toner image 136 to the card 24 at the transfer station 90 will be described. The heated platen 94 includes a contact area 138 having dimensions which are substantially the same as the toner image 136 which is to be transferred to the card 24. This contact area 138 (and hence the image 136) may be any desired size and, for example, may be of a size to occupy the upper right hand corner of the card 24. The card back up block 92 is fixed to a support 140 and includes upper and lower card guides 142 and 144, respectively, for confining the position of the card 24 against the surface of the card back up block 92. Driven rollers 146 are employed to transport the card 24 into an image transfer position on the card back up block 92 and a vacuum conduit 148 is selectively actuated to hold the card in position against the card back up block 92. Once the card 24 has been transported into an image receiving position by the driven rollers 146 and the film 66 carrying the toner image 136 has been transported into a position for transfer, the heated platen 94 is moved in the direction of arrow C in FIG. 8A so that the contact area 138 of the heated platen 94 presses the support base 98 of the electrophotographic film 66, thereby pressing the toner image 136 against the card 24 (FIG. 8B). The heated platen 94 dwells at this contact position for a predetermined period of time and is then withdrawn in the direction of arrow D in FIG. 8B.

In order to achieve the desired transfer of the toner image 136 to the card 24, it is necessary to hold the card 24 flat while the electrophotographic film is pulled away in a peeling motion. The peeling motion creates a very high stress at the interface of the peeled material (i.e., the electrophotographic film 66) with the toner. Since the toner is fused by the heat and pressure generated by the contact area 138 of the platen 94, and because of the elastic properties of the fused toner, the stress diminishes through the toner layer to the card 24. Thus, any break or separation will occur at the point of the highest stress, which is the point at which the electrophotographic film 66 and the toner image 136 interface.

As best seen in FIG. 8A, the transfer station 90 is adapted to peel the electrophotographic film 66 from the card 24 and toner image 136. When the heated platen 94 is in the position illustrated in FIG. 8B the electrophotographic film 66 follows a path denoted by the dashed line F in FIG. 8A. The roller 88 is connected to a link 150 which pivots about a pivot point 152. The roller 88 is biased to the position illustrated by the solid lines in FIG. 8A by a bias spring 154 which is connected to a support 155 and to an end 156 of the link 150. Once the heated platen 94 has been retracted from its transfer position, the link 150 is pivoted about pivot point 152 (by e.g. a solenoid 158) so that the link 150 and roller 88 are moved to the position illustrated by the dashed lines in FIG. 8A. At this point, the path of the electrophotographic film 66 is illustrated by the dotted line G in FIG. 8A, so that as the electrophotographic film 66 is transported around roller 88 the peeling motion illustrated in FIG. 9 is generated, thereby peeling the electrophotographic film 66 from the toner image 136 which remains fused to the card 24. After the peeling process is completed, the solenoid 158 is deenergized, the link 150 pivots back to the position illustrated by the solid lines in FIG. 8A under the bias of the spring 154 and the toner image 136 remains on the card 24 as illustrated in FIG. 8C.

Figure 8C:
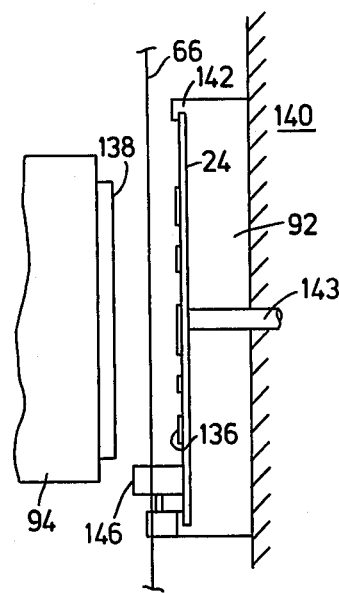
FIG. 8C is a right side elevational view illustrating the position of the platen after transfer of the toner image to the card.
Figure 9:
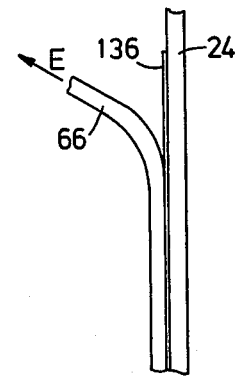
FIG. 9 is a right side elevational view illustrating the peeling motion for peeling the electrophotographic film away from the card carrying the toner image.

The particular, heat, pressure and dwell time employed in the transfer process illustrated in FIGS. 8A to 8C will vary in accordance with the requirements of a particular application. Thus, it is only necessary that the heat, pressure and dwell time be sufficient to fuse the toner to the surface of the card 24. In order to determine one possible set of ranges for heat, pressure and dwell time, which produce an acceptable transfer of the toner image 136 to the outside surface of the card 24, tests using a 0.03 inch thick laminated polyvinyl chloride card were made. The image dimensions were ⅜th inch by 11/16th inch.

TEST 1

The pressure of the platen 94 against the card 24 was varied from 90 to 560 psi, while holding the platen temperature and dwell time constant at 400° F. and 400 ms, respectively.

The acceptable pressure range was determined to be from 360 to 560 psi. Decreasing the platen pressure caused a greater sensitivity to the platen squareness and thickness, thereby causing partial image drop outs (i.e., partial non-transfer) as well as greater sensitivity to partial image drop outs or flaws due to dust particles. Increasing the platen pressure caused plastic card deformation behind the area where the card 24 contacted the toner image 136.

TEST 2

The temperature of the platen 94 was varied from 265° to 520° F. while maintaining the platen pressure and dwell time constant at 560 psi and 400 ms, respectively.

The acceptable temperature range was determined to be from 360° to 416° F. The low temperature range of from 265° to 310° F. produced non-uniform, poor transfer characteristics. The acceptable temperature range of 360° to 416° F. produced excellent transfer characteristics and little mechanical distortion of the card. The high temperature range of 416° to 520° F. caused severe card distortion and some transfer of the film dye, giving the image formed on the card 24 a blue hue. At 520° F. the photoconductive layer 102 separated from the electrophotographic film 66.

TEST 3

The dwell time of the platen 94 was varied from 50 ms to 1 second while maintaining the platen pressure and temperature constant at 500 psi and 400° F., respectively.

The acceptable range for the dwell time was determined to be from 50 ms to 600 ms. This dwell time produced excellent image transfer, however, card distortion behind the image area increased from insignificant at a 50 ms dwell to severe at a 600 ms dwell. However, the card distortion up to 600 ms is acceptable. Dwell times greater than 600 ms produced separation and transfer of the photoconductive layer 102 to the card 24.

The heated transfer platen 94 of the present invention provides significant advantages over prior art image transfer devices such as heated rollers. In the present invention, no visible heat marks remain on the card in areas other than the image area, so that the surface finish of the remaining portions of the card 24 remains intact. In addition, the card 24 may be embossed and/or encoded prior to image transfer since the platen 94 presses only on those portions of the card 24 which are to receive the image 136. Thus, the platen 94 will not damage any prior embossing, nor will it damage any sensitive surfaces such as magnetic stripes which are frequently placed on the back of the card 24.

Figure 10:
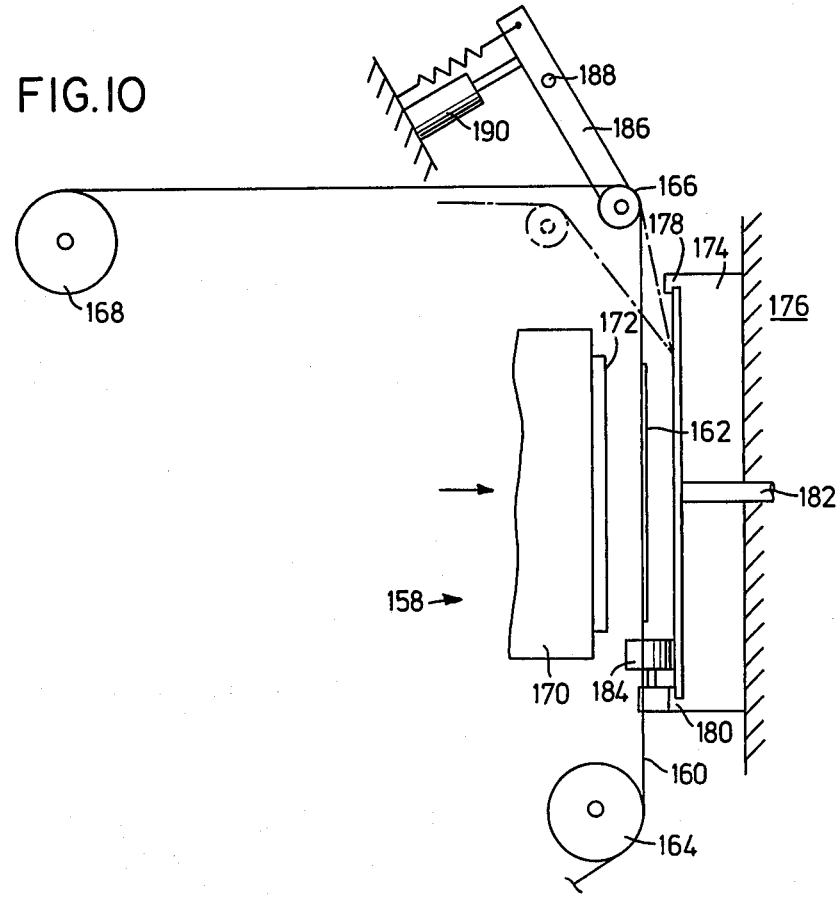
FIG. 10 is a right side elevational view of a station for overlaying a plastic protective layer over the image carried by the card.

While the toner image 136 which is transferred to the card 24 is stable and durable, in the preferred embodiment a protective layer is placed over the image 136 in order to make the image more able to withstand the abrasion and chemicals present in the wallet environment. Referring to FIG. 10, a protective layer transfer station 158 which is similar to the transfer station 90, is illustrated. A carrier film 160 carries a plurality of thin thermoplastic coatings 162 which are approximately the same size as the toner image 136 which is transferred to the card 24. The path of the carrier film 160 is defined by rollers 164, 166 and 168. A heated platen 170 includes a contact area 172 for contacting the carrier film 160 on the side opposite the thermoplastic coating 162. A card back up block 174 is mounted on a support 176 and includes upper and lower card guides 178 and 180, respectively. A vacuum conduit 182 provides a selectively actuated source of vacuum for maintaining the card 24 against the card back up block 174. Driven rollers 184 are driven to transport the card 24 into and out of the protective layer transfer station 158. The heated platen 170 is actuated in the same manner as the heated platen 94 in the transfer station 90. Similarly, the roller 166 is connected to a link 186 which is pivoted about pivot point 188 by a solenoid 190, so that the carrier film 160 is peeled from the thermoplastic coating 162 in the same manner in which the electrophotographic film 66 is peeled from the card 24. In the preferred embodiment, the thermoplastic coating 162 is 150 millionths of an inch thick and the carrier film 160 is 2 mils thick. To produce an acceptable thermoplastic film transfer to the card 24, a preferred minimum pressure of 160 psi and a platen temperature of from 320° F. to 420° F. is applied.

The operation of the system will now be described with reference to FIGS. 2, 3 and 5.

In general, it is desirable to store digital image data and corresponding alphanumeric data for plural cardholders on a magnetic tape, so that a large number of cards 24 may be produced at a single time by inputting the data into a card forming and processing system. In order to capture and store the images as digital image data and to store the alphanumeric data, the video camera 20 takes a picture of each cardholder 22, and the picture is then digitized by the video digitizer circuit 26 and sent to the graphics memory and refresh control circuit 28. The image which is captured by the camera 20 is displayed on the CRT display 30 and the digital image data is transferred from the graphics memory and refresh control circuit 28 to the microprocessor and memory 32. Similarly, alphanumeric data is input to the microprocessor and memory 32 via the keyboard 34. The alphanumeric data may also be displayed on the CRT display 30. When an operator views the desired image on the CRT display 30 and the desired alphanumeric data has been input from the keyboard 34, the corresponding digital image data and alphanumeric data are stored in the microprocessor and memory 32 and are then transferred to the semi-permanent storage 36. As noted above, it is preferred to store the alphanumeric data and digital image data for a large number of cardholders 22 on the semi-permanent storage 36.

When it is desired to process (i.e., emboss/encode a card, form an image on the card, print on a card carrier, and attach a corresponding card 24 to a card carrier) a card 24 the tape reader 108 reads the alphanumeric data and digital image data from the semi-permanent storage 36 (e.g., magnetic tape) and transmits this data to the microprocessor 110. The microprocessor 110 sends the alphanumeric data to the embosser/encoder 60 and the digital image data to the acousto-optic modulator 120 which is a part of the exposure station 72. The electrophotographic film 66 is transported past the sensitizing station 70 where the electrophotographic film 66 is uniformly charged. The charged electrophotographic film 66 is transported past the exposure station 72 where the modulated laser beam 122 (modulated in accordance with the digital image data) is scanned across the charged electrophotographic film 66 by the deflection mirror 130, so as to selectively discharge portions of the electrophotographic film 66 in accordance with the digital image data received by the acousto-optic modulator 120. Thus, once the electrophotographic film 66 has been scanned by the modulated laser beam 122, the film 66 carries a latent electrostatic image. The selectively discharged electrophotographic film 66 is transported past a toning station 74 where charged toner is attracted to the discharged portions of the electrophotographic film 66, so that the toner image 136 (FIG. 7) is formed on the electrophotographic film 66. The electrophotographic film 66 is transported past the air knife 80 so as to remove any loose toner from the toner image 136, and is subsequently transported to a position in between the heated platen 94 and the card 24 which is supported by the card back-up block 92. The card 24 has been embossed and/or encoded by the embosser/encoder 60 in accordance with the alphanumeric data corresponding to the toner image which is to be transferred to the card 24. The toner image 136 is pressed against the card 24 by the platen 94 (FIGS. 8A-8C) to transfer the toner image 136 to the card 24. As illustrated in FIG. 9, the electrophotographic film 66 is peeled away from the card 24 so that the toner image 136 remains intact on the card 24. The card 24 carrying the toner image 136 is then transported to the protective layer transfer station 158 where the thermoplastic coating 162 is transferred to the card 24 to protect the toner image 136 from degradation due to the abrasion and chemicals in a wallet environment. After the thermoplastic coating 162 has been overlayed on the card 24, the card 24 (carrying the image and embossing/encoding) may be transported to the card attaching system 62 where the card is attached to a carrier having corresponding cardholder indicia printed thereon.

The system of the present invention may be implemented in numerous ways. For example, any type of electrophotographic medium, such as a selenium drum, may be used as the electrophotographic medium 66. Similarly, the electrophotographic medium 66 may be charged or discharged in any desired manner, with the corresponding charged toner (i.e. positive or negative) being used to tone the charged or discharged areas. In addition, the card 24 may be embossed and/or encoded before or after the image is formed on the card; and, if desired, embossing or encoding can be omitted if the image includes the alphanumeric data as a part thereof. The values of heat, pressure and dwell time employed to transfer the toner image 136 to the surface of the card 24 may be varied in accordance with the requirements of a particular application. Further, although the card used in the above experiments was composed of polyvinyl chloride, the card 24 may be made of any suitable material to which the toner can be fused.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A method of forming an image on a card, comprising:
    (a) digitizing an image to generate a digital image signal;
    (b) storing the digital image signal;
    (c) reading the digital image signal;
    (d) modulating a coherent light beam in accordance with the read digital image signal;
    (e) scanning the modulated coherent light beam across an electrophotographic film to selectively expose the electrophotographic film;
    (f) toning the electrophotographic film with a liquid toner to form a toner image on the electrophotographic film;
    (g) transferring the toner image from the electrophotographic film to a predetermined portion of a card by pressing electrophotographic film and the toner image against the predetermined portion of the card while heating the electrophotographic film with a heated platen for releasing the toner image from the film and bonding it to the card; and
    (h) peeling the electrophotographic film away from the card so that the toner image is removed from the film and remains on the card.

2. A method of forming an image on a card, comprising:
    (a) digitizing an image to form a digital image signal;
    (b) storing the digital image signal;
    (c) reading the stored digital image signal;
    (d) modulating a coherent light beam in accordance with the read digital image signal;
    (e) charging an electrophotographic film;
    (f) scanning the modulated coherent light across at least a portion of the charged electrophotographic film to selectively discharge that portion of the electrophotographic film so that a latent electrostatic image is formed thereon;
    (g) toning the electrophotographic film to form a toner image;
    (h) transferring the toner image to a predetermined portion of the card by pressing the toner image against the predetermined portion of the card while heating the electrophotographic film to release the toner image from the film and bond it to the card;
    (i) peeling the electrophotographic film away from the card so that the toner image remains bonded to the card; and
    (j) forming a protective layer over the toner image formed on the card.

3. A method as set forth in claim 2, wherein said pressing and heating step comprises:
    pressing the toner image against the predetermined portion of the card at a pressure of from 360 to 560 psi, while heating the electrophotographic film at a temperature of from 360° to 416° F. for a dwell time of from 50 ms to 600 ms.

4. A system for forming an image on a card, comprising:
    a roll of electrophotographic film;
    corona means for applying an electrostatic charge to the surface of the electrophotographic film to sensitize the film to receive an image;
    a laser light source for generating a coherent light beam;
    first means for receiving a digital image signal;

an acousto-optic modulator, operatively connected to said first means and positioned in the path of the coherent light beam, for modulating the coherent light beam in accordance with the digital image signal;

second means for scanning the modulated coherent light beam across the electrophotographic film to selectively expose the electrophotographic film;

third means for forming a toner image on the electrophotographic film; and fourth means for releasing the toner image from the film and transferring the toner image from the electrophotographic film to a predetermined portion of the card by applying heat and pressure to bond the toner image to the card and release it from the electrophotographic film.

5. A system as set forth in claim 4, wherein said fourth means comprises:

a heated platen having dimensions which are substantially the same as the toner image to be transferred to the card, said heated platen movable to press the portion of the electrophotographic film carrying the toner image against the predetermined portion of the card; and means for peeling the electrophotographic medium from the card so that the toner image remains on the card.

6. A system as set forth in claim 5, wherein said fourth means further comprises:

a card back up block positioned opposite said heated platen, for holding the card while said heated platen is moved to press a portion of the electrophotographic film carrying the toner image against the predetermined portion of the card.

7. A system as set forth in claim 6, wherein said second means comprises a deflection mirror and a galvanometer connected to said deflection mirror.

8. A system as set forth in claim 6, wherein said light source is a laser.

9. A system for forming an image on a card, comprising:

an electrophotographic film sheet;

means for generating a coherent light beam;

first means for receiving a digital image signal;

second means, operatively connected to said first means and positioned in the path of the coherent light beam, for modulating the coherent light beam in accordance with the digital image signal;

third means for scanning the modulated coherent light beam across the electrophotographic film to selectively expose the electrophotographic film;

fourth means for forming a toner image on the electrophotographic film;

heated platen means having dimensions which are substantially the same as the toner image to be transferred to the card, said platen means movable for pressing the portion of the electrophotographic film carrying the toner image against the predetermined portion of the card and bonding the toner image to the card; and fifth means for peeling the electrophotographic film from the card so that the toner image remains on the card.

10. A system as set forth in claim 9, wherein said heated platen is a flat heated platen.

11. A system as set forth in claim 9, further comprising:

means for overlaying a protective coating on the toner image carried by the card.

* * * * *